Sept. 19, 1944.  P. J. QUINN  2,358,592
PARKING DEVICE
Filed May 14, 1943  2 Sheets-Sheet 1
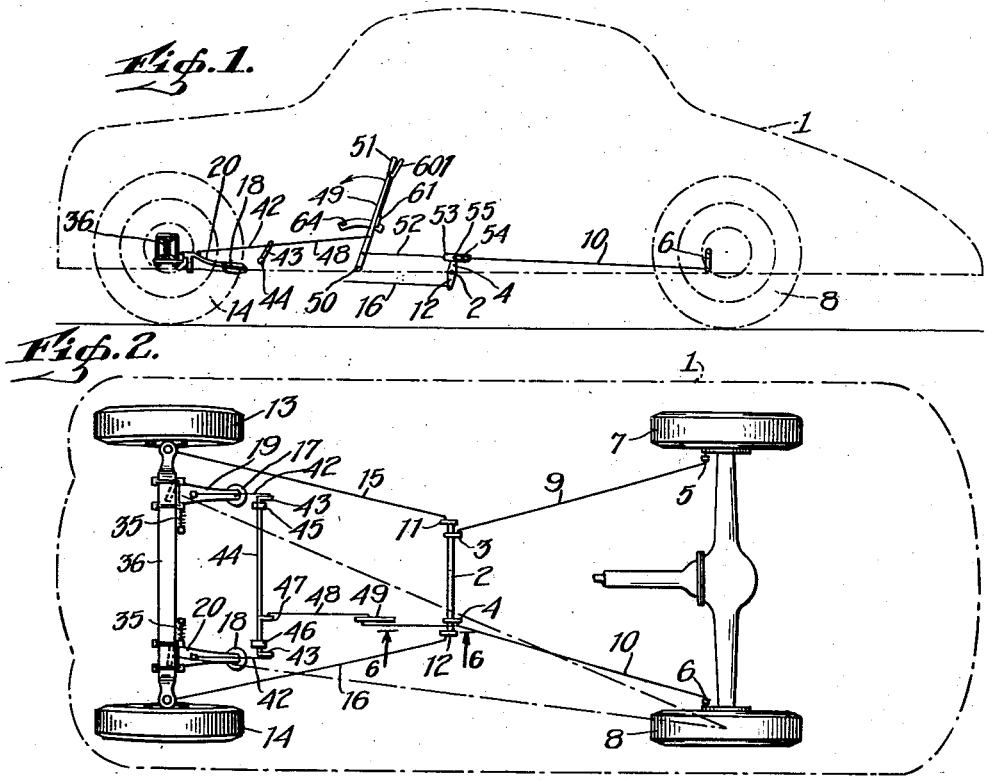
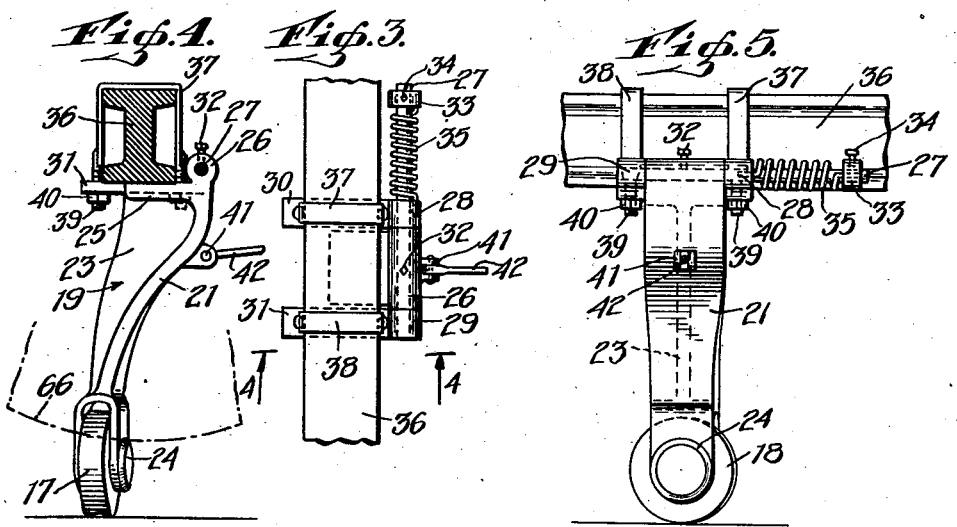
INVENTOR
PATRICK J. QUINN
BY
ATTORNEY Sept. 19, 1944.  P. J. QUINN  2,358,592
PARKING DEVICE
Filed May 14, 1943  2 Sheets-Sheet 2
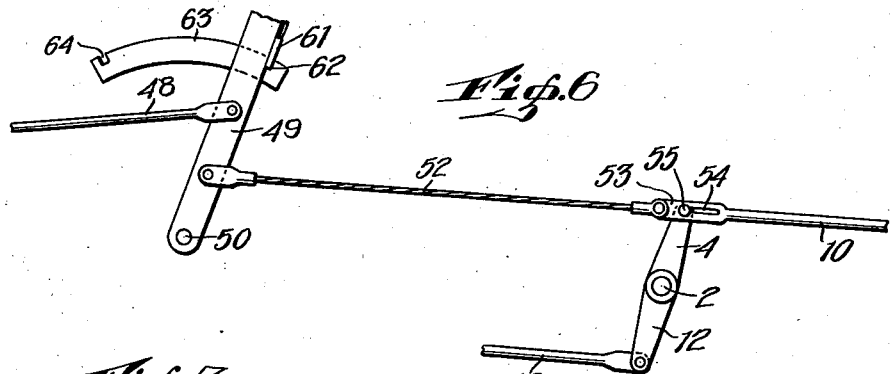
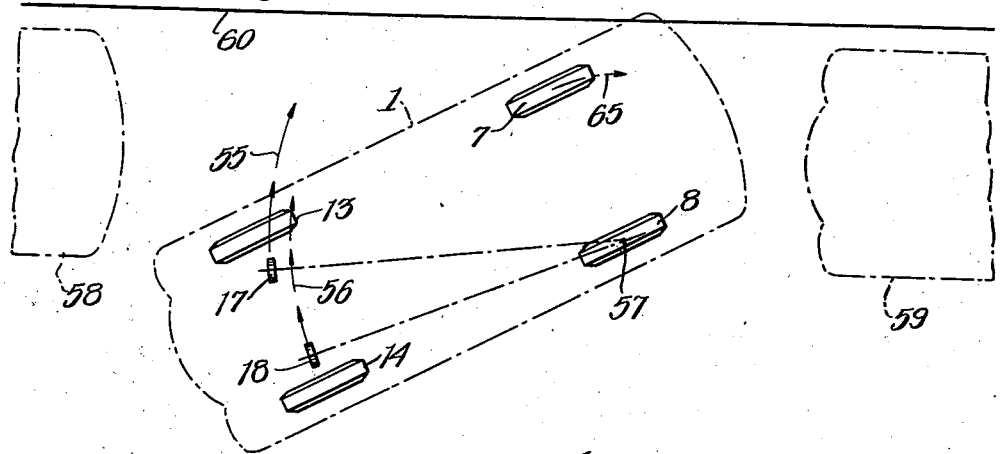
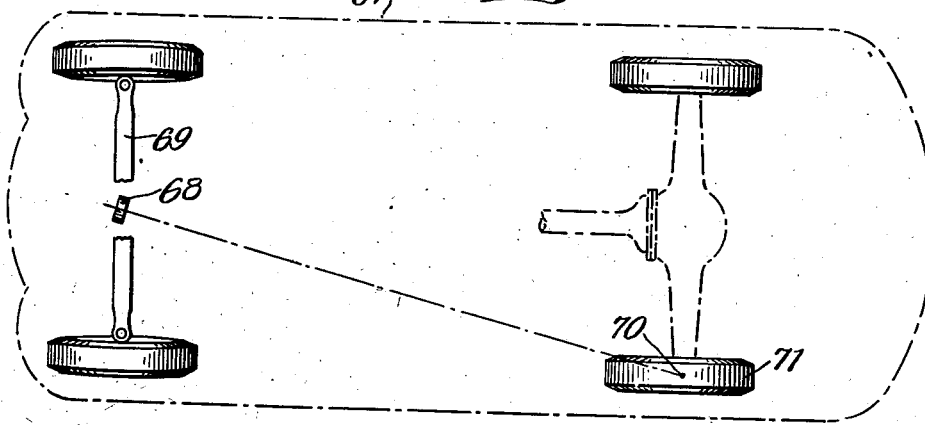
INVENTOR
PATRICK J. QUINN
BY
ATTORNEY Patented Sept. 19, 1944

2,358,592

UNITED STATES PATENT OFFICE 2,358,592

PARKING DEVICE

Patrick J. Quinn, Flushing, N. Y.

Application May 14, 1943, Serial No. 486,975

3 Claims. (Cl. 180—1)

This invention relates to parking devices in general and more especially to devices for use with automobiles to facilitate steering or maneuvering automobiles into position, particularly when the space available for parking is limited.

Among the objects of the present invention it is aimed to provide an improved parking device which contemplates the use of means for braking one of the rear wheels of a car, raising the main front wheels from the ground and transferring the load to an auxiliary wheel or plurality of auxiliary wheels of comparatively small diameter to facilitate making a sharp turn or making a turn at a sharp angle about a pivot point determined by an imaginary vertical line drawn through the center of the rear wheel which has been locked or anchored by a brake.

More specifically, the invention aims to provide a device for parking a car, as an instance along the right side of a street at the curb within a limited space, by turning the car about the vertical center of the left rear wheel, after transferring the load from the main front wheels onto one or a set of auxiliary wheels of small diameter while the engine is running and the shift is registered in reverse.

It is still another object of the present invention to provide an auxiliary wheel or wheels of small diameter and a pivotally mounted bracket for the same so operatively connected to the front axle of the car that when the bracket is swung down into load supporting position, its ground engaging contact will be forward of a vertical line passing through the pivotal point of the bracket and preferably also forward of the center of gravity of the axle of the main front wheels.

It is still another object of the present invention to provide an improved parking device including a control characterized by a lever connected by a cable to the braking device of one rear wheel and by another cable to an auxiliary or set of auxiliary wheels to which the load of the front wheels may be transferred, such cables being so connected to said control lever that the auxiliary wheels will be in position to receive the load of the front wheels before the rear wheel is locked against movement.

These and other features, capabilities and advantages of the invention will appear from the subjoined detail description of specific embodiments thereof illustrated in the accompanying drawings in which Figure 1 is a side elevation more or less diagrammatically shown of a car equipped with the present improvement made according to one embodiment and in disuse.

Fig. 2 is a plan view more or less diagrammatically shown of the car and improvement illustrated in Figure 1.

Fig. 3 is an enlarged fragmental plan view of a part of the improvement illustrated in Figure 1.

Fig. 4 is a section on the line 4—4 of Fig. 3.

Fig. 5 is an enlarged front elevation of the part illustrated in Fig. 3.

Fig. 6 is a fragmental detail enlarged with respect to Figures 1 and 2 showing a part of the control mechanism.

Fig. 7 is a diagram showing a car equipped according to the embodiment illustrated in Figures 1 and 2 ready to be parked, and showing by arrows the direction of the parts of the car to be moved.

Fig. 8 is a plan view more or less diagrammatically shown of a car equipped with the present improvement made according to a second embodiment.

In the embodiment shown in Figs. 1 to 7, inclusive, the car 1 is provided with a main brake control shaft or jack shaft 2 on which are mounted the upwardly extending arms 3 and 4 connected to the brake mechanism 5 and 6 of the rear wheels 7 and 8, respectively, by the rods 9 and 10, and on which shaft 2 are also mounted the downwardly extending arms 11 and 12 which are connected to the brake mechanism of the front wheels 13 and 14 by the rods 15 and 16, respectively.

The mechanism now to be described constitutes the main part of the present invention. Still referring to the embodiment referred to in Figs. 1 to 7, inclusive, there are provided a pair of auxiliary wheels 17 and 18, see Fig. 7, which are journalled in the free ends of the brackets 19 and 20, respectively. These brackets 19 and 20 are L shaped in cross section, see particularly Figs. 4 and 5. Since the brackets 19 and 20 are substantially identical in construction, only one, the bracket 19, will be described in detail. The web 21 extends at an angle to the web 23 and at its lower end is bifurcated and provided with a shaft 24 to receive the wheel 17. At the upper edge of the web 23 there is provided a stop plate 25 extending to and integral with the web 21 provided with an enlargement 26 directly above the web 21 to receive a pin or shaft 27. The shaft 27 extends through the enlargement 26 and then through the journals 28 and 29 of the bars 30 and 31, respectively. The shaft 27 is fixed to rotate with the enlargement 26 by the set screw 32. The shaft 27 extends beyond the journal 28 and its outer end is provided with a collar 33 fixed thereto by the pin 34 which collar 33 in turn is connected by the coil spring 35 wound around the pin 27 and connected at its other end to the journal 28 whereby tension will be transmitted to the journal 26 normally to urge the stop plate 25 up against the lower face of the axle 36 as shown in Figs. 4 and 5. The axle 36 in the present instance is the axle of the front wheels 13 and 14. The bars 30 and 31 are connected to the axle 36 by the U shaped straps 37 and 38, respectively, the free ends of the straps being provided with screw threaded extensions 39 to receive the nuts 40 below the lower faces of the bars 30 and 31.

The enlargement 26 of each bracket 19 and 20 has an extension 41 on the rear face thereof below the stop plate 25 a sufficient distance to afford a suitable leverage for the control cable 42 pivotally connected to such extension 41. The cable 42 is in turn pivotally connected to the upper end of the arm 43 fixed to the shaft 44 journalled in the bearings 45 and 46 suitably mounted on the chassis of the automobile. As shown in Fig. 2, the brackets 19 and 20 are independently connected to separate arms 43 fixed on the shaft 44. The shaft 44 in turn is preferably provided with a third upwardly extending arm 47 which is connected by the cable 48 to the control lever 49 which is preferably fulcrumed at 50 to the chassis of the automobile below the floor board of the car adjacent to the seat thereof so that its upper handle 51 may be conveniently located for use by the driver of the car. Between the pivotal connection of the cable 48 with the control lever 49 and the fulcrum point 50, the cable 52 is preferably connected, the other end of the cable 52 being connected, see Fig. 6, to the end piece 53 of the rod 10. This end piece 53 is preferably provided with a slot 54 to receive the pin 55 of the arm 4 as shown in Fig. 6.

The auxiliary wheels 17 and 18 are mounted in the brackets 19 and 20, respectively, at an angle thereto as shown in Fig. 7. This angle is predetermined so that the wheels 17 and 18 both may travel in circles, as an instance the circles 55 and 56, respectively, which have a common center 57 coinciding with an imaginary vertical line extending through the axis of the left rear wheel 8. While the wheels 17 and 18 and their brackets 19 and 20 in the present instance are shown as having a fixed angle, it is, of course, obvious that without departing from the general spirit of the present invention these wheels 17 and 18 or their journals at the lower ends of the brackets 19 and 20, respectively, or the brackets 19 and 20 themselves can be adjustably mounted to travel in arcs that are concentric with one another and with the center of the rear wheel 8. In other words, if the brackets 19 and 20 are always mounted on the shaft 36 at one and the same predetermined position relative to the ends thereof, then the wheels 17 and 18 may have a predetermined fixed angle relative to the brackets 19 and 20. However, if the position of the brackets 19 and 20 on the axle 36 is not predetermined but may in some cases be positioned nearer the center, as an instance as compared to the position shown in Fig. 2, in order that the wheels 17 and 18 may travel in arcs that are concentric with one another and with the center of the rear wheel 8, suitable adjustments must be made.

With the embodiments illustrated in Figs. 1 to 7, inclusive, in order to park the car 1 within a limited area, as an instance between the cars 58 and 59 shown in Fig. 7 and adjacent to the curb 60, it will only be necessary for the driver to back the car into the area where the center 57 of the rear wheel 8 will be positioned fairly close to the left front end of the car 59. Thereupon the driver is only required to engage the control lever 49, actuating the release grip 601 to free the catch 61 from the notch 62 in the bar 63, and press the handle 49 forwardly. When so actuating the lever 49 forwardly, the slot 54 at the front end of the rod 10 would move along the pin 55 in the upper end of the arm 4 so that the shaft 2 will not be actuated to disturb the braking mechanism of the right rear wheel 7 and front wheels 13 and 14, and only actuate the brake mechanism 6 of the rear wheel 8 through the rod 10. During the first portion of the aforesaid forward movement of the control lever 49, the normal lost motion of the operative connection for the brake mechanism 6 of the wheel 8 will be taken up, without effecting any braking action on the rear wheel 8, during which period, however, sufficient time will have elapsed for the springs 35 to take up the lost motion in the operative connections between the lever 49 and the brackets 19 and 20 to cooperate with gravity to bring the auxiliary wheels 17 and 18 into gripping engagement with the ground or supporting surface. In the meantime the shift having been placed into reverse, and the clutch pedal of the car then released, the succeeding slight rearward movement of the car will cause the wheels 13 and 14 to move rearwardly relative to the auxiliary wheels 17 and 18, thereby transferring the load from the wheels 13 and 14 to the auxiliary wheels 17 and 18. During this motion the brackets 19 and 20 will swing rearwardly about a fulcrum determined by the supporting surface or pavement and the tread of the auxiliary wheels 17 and 18. This rearward motion will in turn also cause a toggle effect to be produced by moving the axis of the shafts 27 rearward of vertical lines passing through the auxiliary wheels 17 and 18, and also in the present instance, cause the axial center of the axle 36 to move rearwardly of vertical lines passing through the auxiliary wheels 17 and 18. When the control lever 49 is thereupon swung forwardly to its final resting place where the catch 61 registers with the recess 64, where the auxiliary wheels 17 and 18 are well forward of the vertical center of the axle 36, the brake rod 10 will now be effectively actuated to brake the rear left wheel 8 so that the thereupon ensuing rear movement of the car will move the car in the direction of the arrows 55, 56 and 65, these arrows 55 and 56 coinciding with the arcs described by the auxiliary wheels 17 and 18 and the arrow 65 coinciding with the arc described by the rear wheel 7.

It is, of course, understood that the auxiliary wheels 17 and 18 will now support the front end of the car, the load being transferred from the wheels 13 and 14 to the wheels 17 and 18 when the wheels 17 and 18 are moved into the position shown in Figs. 3 and 4, the wheels 17 and 18 extending down below the wheels 13 and 14, see the dash and dot line 66 illustrating the relative positions of the wheels 13 and 14 diagrammatically, when the wheels 17 and 18 are in load supporting position.

After the car 1 has been parked adjacent to the curb 60 it may either remain supported on the auxiliary wheels 17 and 18 until the driver is ready to move the car out of this space, or else the lever 49 actuated to release the brake on the wheel 8, thereupon the transmission shifted into first and the clutch lever released to enable the car to move forwardly off the auxiliary wheels 17 and 18 to transfer the load back to the wheels 13 and 14. If you now wish to remove the car from the curb 60, assuming that you have allowed the front end of the car to be supported on the auxiliary wheels 17 and 18, it will only be necessary to shift into first and release the clutch pedal, when the car under its own power will swing away from the curb 60 in the opposite direction to that described by the arcs of the arrows 55, 56 and 65. On the other hand, if you had retransferred the load from the auxiliary wheels 17 and 18 to the front wheels 13 and 14, and you now wish to swing away from the curb 60, it will merely be necessary to transfer the load back to the auxiliary wheels 17 and 18 as in parking, shift the transmission into first and move the car forwardly, when the car will move in the reverse direction to that described by the arcs of the arrows 55, 56 and 65.

In the embodiment shown in Fig. 8 the car 67, instead of being equipped with a plurality of wheels 17 and 18, is equipped with a single auxiliary wheel 68. This single auxiliary wheel 68 is preferably connected by a bracket to the axle 69 and adjacent the center thereof to coincide with and describe an arc that is concentric with a vertical line passing through the center 70 of the left rear wheel 71. The control means for the wheel 68 can be connected to a shaft similar to the shaft 44 of the embodiment illustrated in Figure 1, which shaft 44 in turn may be connected to a control lever, such as the control lever 49, of the embodiment illustrated in Figure 1.

It is obvious that the auxiliary movable support may consist of a single auxiliary wheel 68 such as illustrated in Fig. 8, or two or more auxiliary wheels such as the wheels 17 and 18 of the embodiment illustrated in Fig. 7, without departing from the general spirit of the invention.

It is obvious that various changes and modifications may be made to the details of construction without departing from the general spirit of the invention as set forth in the appended claims.

I claim:

1. The combination of a car having rear wheels, a front axle and front wheels operatively associated with said front axle, brakes for said wheels, a common control shaft, means operatively connecting said control shaft to said brakes including a brake rod for each of said rear wheels, an auxiliary movable support for the front wheels pivotally connected to said front axle and extending down below said axle in supporting position to transfer the load from said front wheels to said movable support, yieldable means for normally urging said movable support into supporting position, a slotted connection between the brake rod of one of said rear wheels and said control shaft, a control lever, means operatively connecting said slotted connection with said control lever which when actuated applies the brake to said one rear wheel to the exclusion of the brakes of the other wheels, and means for anchoring said movable support in opposition to said yieldable means out of supporting position, said anchoring means being operatively connected to said control lever which when actuated to apply the brake enables said yieldable means to initiate the movement of said movable support into position for transferring the load from said front wheels to said movable support in turn to enable the car in reverse under its own power to describe arcs by said movable support and by said other rear wheel which arcs are concentric to the rear wheel arrested by brake.

2. The combination of a car having rear wheels, a front axle and front wheels operatively associated with said axle, an auxiliary parking wheel, a bracket for said auxiliary parking wheel pivotally connected to said front axle movable rearward into inactive position and extending down below said axle in supporting position to transfer the load from said front wheels to said auxiliary parking wheel, yieldable means for normally urging said auxiliary wheel into supporting position, a brake for the outer rear wheel or rear wheel normally remote from the curb, means for applying said brake to the exclusion of the brakes of said other wheels, and releasable means for anchoring said auxiliary wheel in opposition to said yieldable means out of supporting position and actuatable to enable said yieldable means to initiate the movement of said auxiliary wheel into position for transmitting the load from said front wheels to said auxiliary parking wheel after which when said brake is applied it will in turn enable the car in reverse under its own power to describe arcs by said auxiliary parking wheel and by said other rear wheel which arcs are concentric to the rear wheel arrested by brake.

3. The combination of a car having rear wheels, a front axle and front wheels operatively associated with said axle, an auxiliary parking wheel, a bracket, a shaft on which said auxiliary wheel is mounted journalled in said bracket, said bracket being pivotally connected to said front axle movable rearward into inactive position and extending down below said axle in supporting position to transfer the load from said front wheels to said auxiliary parking wheel, yieldable means for normally urging said auxiliary wheel into supporting position, a brake for the outer rear wheel or rear wheel normally remote from the curb, said shaft extending radially to the center of said outer rear wheel, means for applying said brake to the exclusion of the brakes of said other wheels, and releasable means for anchoring said auxiliary wheel in opposition to said yieldable means out of supporting position and actuatable to enable said yieldable means to initiate the movement of said auxiliary wheel into position for transmitting the load from said front wheels to said auxiliary parking wheel after which when said brake is applied it will in turn enable the car in reverse under its own power to describe arcs by said auxiliary parking wheel and by said other rear wheel which arcs are concentric to the rear wheel arrested by brake.

PATRICK J. QUINN.